(12) United States Patent
Takahashi

(10) Patent No.: US 9,407,792 B2
(45) Date of Patent: Aug. 2, 2016

(54) COLOR PROCESSING APPARATUS AND METHOD THEREFOR WITH CORRECTION OF TRISTIMULUS VALUES ACROSS MULTIPLE SETS OF COLOR MATCHING FUNCTION

(71) Applicant: CANON KABUSHIKI KAISHA, Tokyo (JP)

(72) Inventor: Kosei Takahashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/659,257

(22) Filed: Mar. 16, 2015

(65) Prior Publication Data

US 2015/0281522 A1 Oct. 1, 2015

(30) Foreign Application Priority Data

Mar. 26, 2014 (JP) ................................. 2014-064346

(51) Int. Cl.
*G06K 1/00* (2006.01)
*H04N 1/60* (2006.01)

(52) U.S. Cl.
CPC ........... *H04N 1/6011* (2013.01); *H04N 1/6027* (2013.01); *H04N 1/6052* (2013.01); *H04N 1/6086* (2013.01); *H04N 1/6088* (2013.01)

(58) Field of Classification Search
None
See application file for complete search history.

(56) References Cited

U.S. PATENT DOCUMENTS

| | | | | |
|---|---|---|---|---|
| 6,340,976 | B1 * | 1/2002 | Oguchi | H04N 17/04 345/22 |
| 6,987,567 | B2 | 1/2006 | Takahashi et al. | |
| 7,433,102 | B2 | 10/2008 | Takahashi et al. | |
| 7,443,536 | B2 | 10/2008 | Takahashi | |
| 7,616,361 | B2 | 11/2009 | Takahashi | |
| 7,667,845 | B2 | 2/2010 | Takahashi et al. | |
| 7,705,857 | B2 * | 4/2010 | Edge | H04N 1/6075 345/591 |
| 7,889,919 | B2 * | 2/2011 | Komiya | H04N 5/2256 356/404 |
| 9,008,412 | B2 | 4/2015 | Takahashi | |
| 2010/0231941 | A1 * | 9/2010 | Tsutsumi | G06T 5/50 358/1.9 |
| 2013/0328900 | A1 | 12/2013 | Takahashi | |

FOREIGN PATENT DOCUMENTS

JP 2010-169427 A 8/2010

OTHER PUBLICATIONS

Kita, Yasushi, et al., "Discrepancies Between Color Appearance and Measured Chromaticity Coordinates of High Intensity Discharge Lamp and White LED," Journal of the Illuminating Engineering Institute of Japan, vol. 94, No. 2, pp. 92-99, Feb. 2010.

* cited by examiner

*Primary Examiner* — Steven Kau
(74) *Attorney, Agent, or Firm* — Fitzpatrick, Cella, Harper & Scinto

(57) ABSTRACT

A plurality sets of tristimulus values are calculated from input spectral data using a plurality sets of color matching functions. Correction coefficients for tristimulus values are calculated based on derivation methods of the plurality sets of color matching functions. Corrected tristimulus values are calculated from the plurality sets of tristimulus values using the correction coefficients.

13 Claims, 10 Drawing Sheets

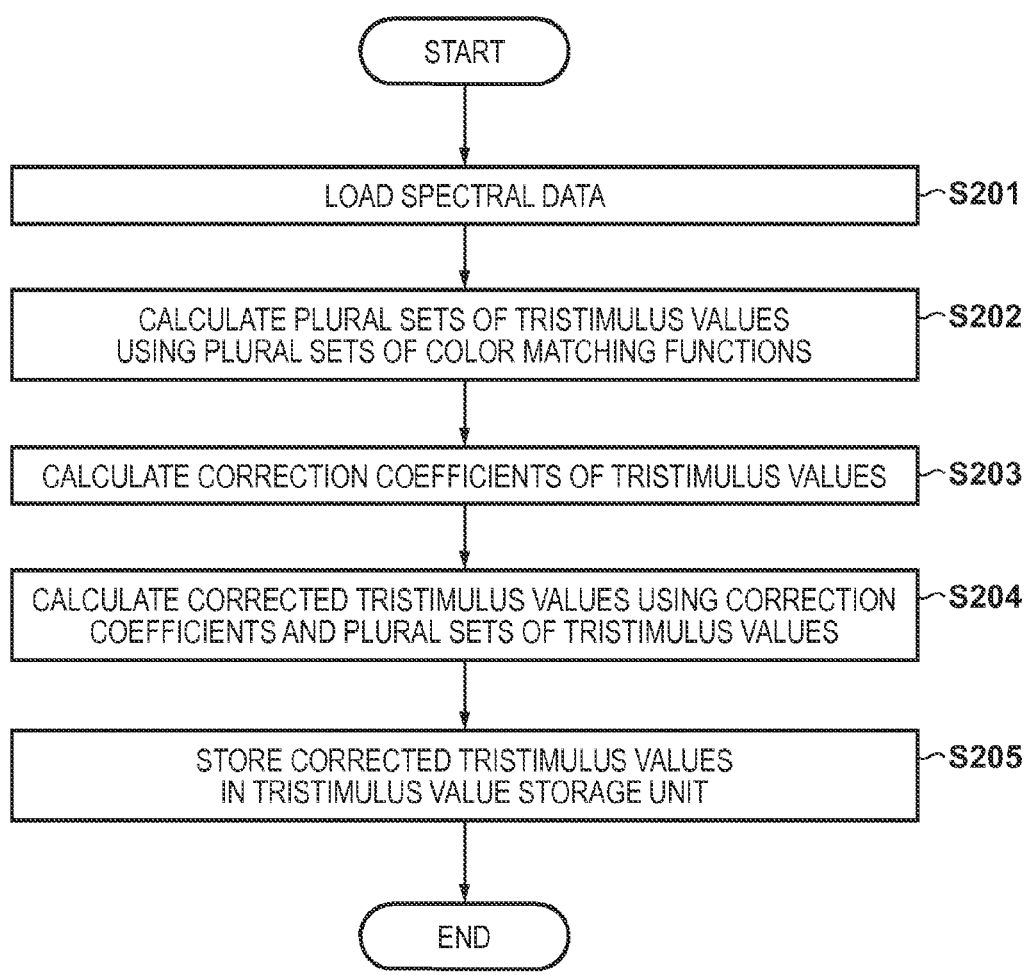

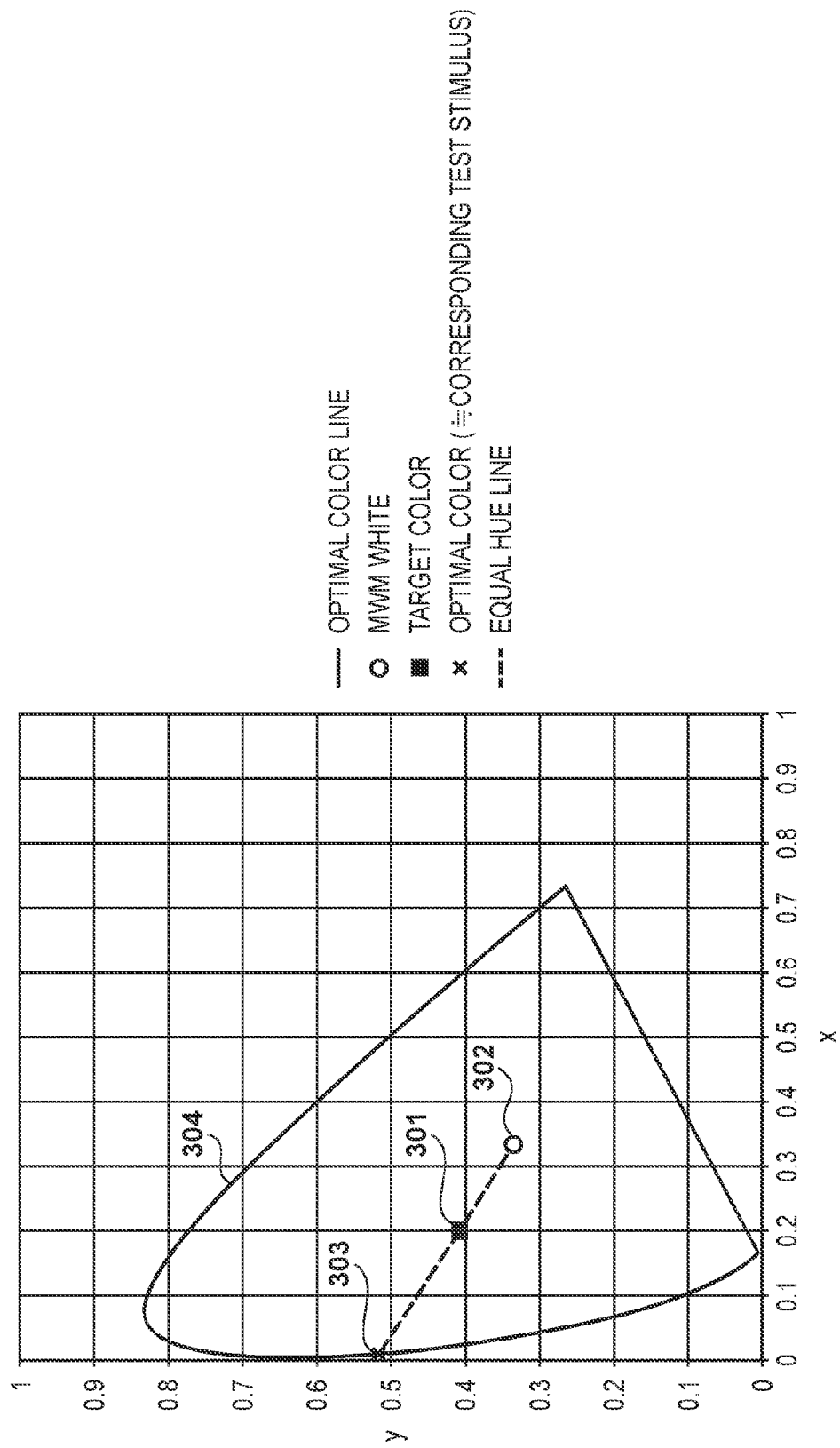

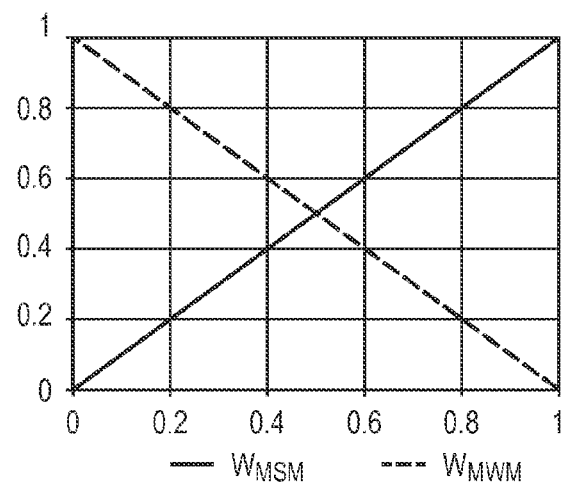
F I G. 5A
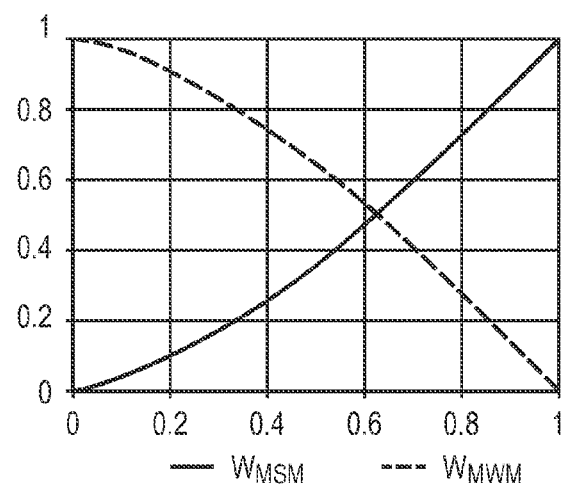
F I G. 5B
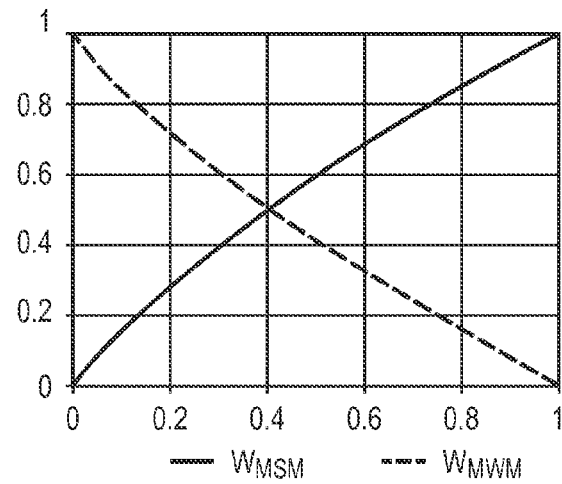
F I G. 5C

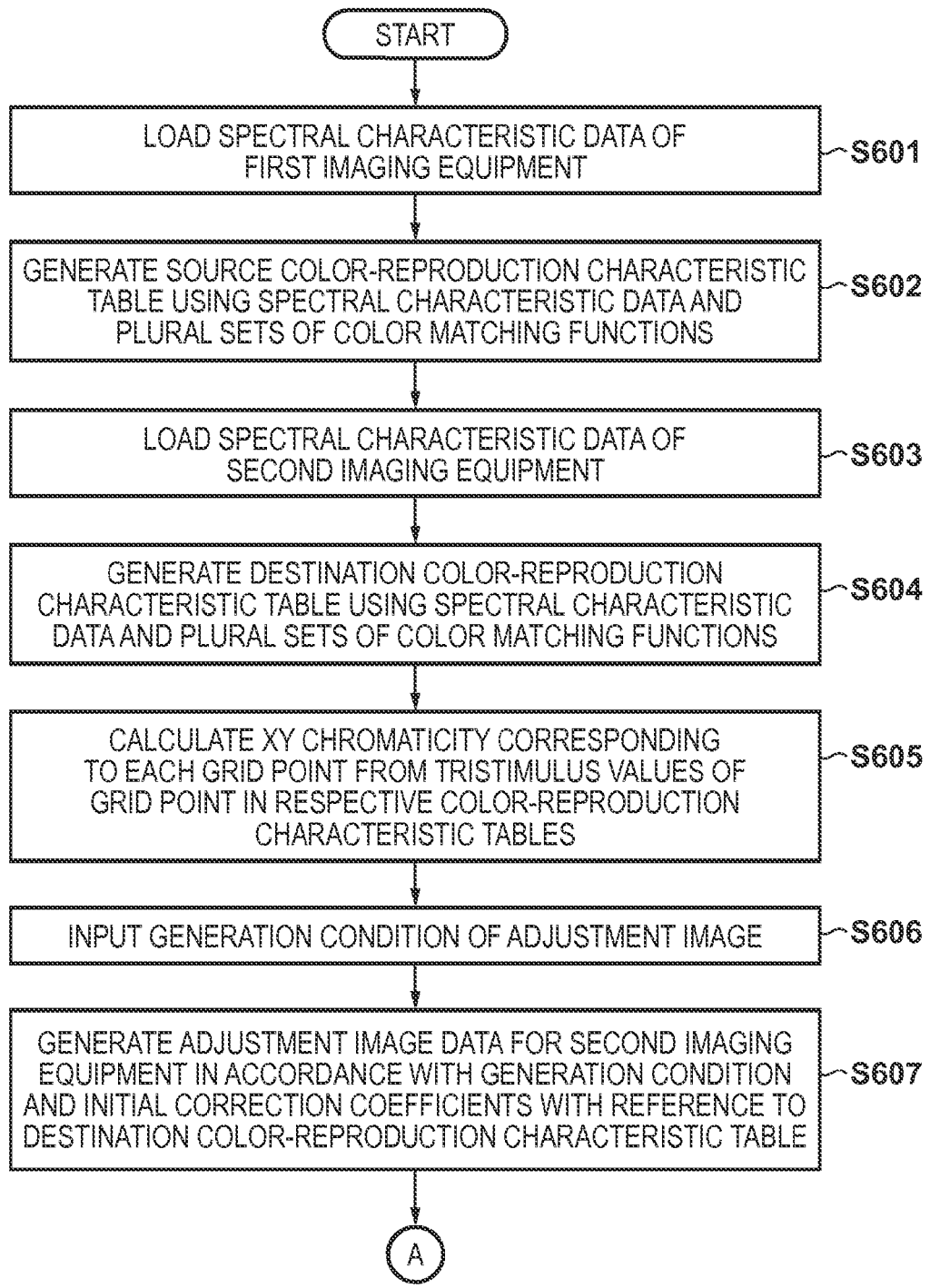

COLOR PROCESSING APPARATUS AND METHOD THEREFOR WITH CORRECTION OF TRISTIMULUS VALUES ACROSS MULTIPLE SETS OF COLOR MATCHING FUNCTION

BACKGROUND OF THE INVENTION

1. Field of the Invention

The present invention relates to color system conversion processing and generation of a color matching table.

2. Description of the Related Art

When performing color matching between different imaging equipments such as a monitor and printer, it is generally impossible to match the spectral characteristics of both the imaging equipments, and color matching using metamerism is used. Metamerism is a method of matching colors perceived by the humans based on the so-called Young-Helmholtz's trichromatic theory in which when the human perceives the color, he/she perceives the color based on responses of three kinds of cells called cones instead of perceiving the spectral characteristic itself.

As conversion from spectral data into trichromatic data, that is, color system conversion processing, for example, a method of converting data into XYZ tristimulus values using color matching functions (CIE 1931 color matching functions) is used. The color matching functions were defined by CIE (Commission Internationale de l'Éclairage) in 1931, and have become widespread.

It has been pointed out, however, that the CIE 1931 color matching functions cause an error with respect to the actual visual characteristic. For example, the CIE 1931 color matching functions are defined by the average value of results of performing a color matching experiment by a plurality of examinees. However, it is known that the color matching functions have individual differences.

Japanese Patent Laid-Open No. 2010-169427 discloses a technique associated with a color system conversion method considering the individual differences of the color matching functions. Literature 1 below describes that even for the same observer, color matching functions to be derived are different due to a difference in color matching experiment method for deriving color matching functions.

Literature 1: Yasushi Kita, et al. "Discrepancies between Color Appearance and Measured Chromaticity Coordinates of High Intensity Discharge Lamp and White LED", Journal of the Illuminating Engineering Institute of Japan Vol. 94, No. 2, p. 92, February 2010.

However, it is known that color matching functions change depending on a person, and also change depending on a target color even for the same observer. FIG. 1 shows the schematic arrangement of a color matching experiment for obtaining color matching functions. As the color matching experiment, there exist a maximum saturation method (MSM) which uses, as a test stimulus, light obtained by synthesizing a plurality of high-saturation monochromatic light beams (for example, bright line spectra of 435.8 nm, 546.1 nm, and 700 nm), and a Maxwell method (MWM) which uses a single white light beam as a test stimulus. However, color matching functions to be derived by the test stimuli are different.

In color system conversion processing using identical color matching functions, it is impossible to obtain sufficient conversion accuracy depending on a target color, thereby deteriorating the color matching accuracy.

SUMMARY OF THE INVENTION

In one aspect, a color processing apparatus comprising: a first calculation unit configured to calculate a plurality sets of tristimulus values from input spectral data using a plurality sets of color matching functions; a second calculation unit configured to calculate correction coefficients for tristimulus values based on derivation methods of the plurality sets of color matching functions; and a third calculation unit configured to calculate corrected tristimulus values from the plurality sets of tristimulus values using the correction coefficients.

According to the aspect, it is possible to prevent the conversion accuracy from decreasing due to a method of deriving color matching functions when performing color system conversion from spectral data into tristimulus values.

Further features of the present invention will become apparent from the following description of exemplary embodiments with reference to the attached drawings.

BRIEF DESCRIPTION OF THE DRAWINGS

FIG. 3 is a flowchart for explaining tristimulus value calculation processing.

FIG. 4 is an xy chromaticity diagram showing the relationship between the chromaticity point of a color to be converted, the chromaticity point of MWM white, and the chromaticity point of corresponding monochromatic light.

FIGS. 5A to 5C are graphs each showing the relationship between a chroma and correction coefficients.

FIGS. 7A and 7B are flowcharts for explaining color matching LUT generation processing.

DESCRIPTION OF THE EMBODIMENTS

Color processing according to an embodiment of the present invention will be described in detail below with reference to the accompanying drawings.

As described above, as a color matching experiment, there exist the MSM using, as a test stimulus, light obtained by synthesizing a plurality of high-saturation monochromatic light beams, and the MWM using a single white light beam as a test stimulus. A color matching experiment by the MSM will be referred to as an "MSM color matching experiment" hereinafter, and a color matching experiment by the MWM will be referred to as an "MWM color matching experiment" hereinafter. Color matching functions derived by an MSM color matching experiment will be referred to as "MSM color matching functions" hereinafter, and color matching functions derived by an MWM color matching experiment will be referred to as "MWM color matching functions" hereinafter. Furthermore, XYZ tristimulus values calculated using the MSM color matching functions will be referred to as "MSM tristimulus values" hereinafter, and XYZ tristimulus values calculated using the MWM color matching functions will be referred to as "MWM tristimulus values" hereinafter. Note that XYZ tristimulus values may be simply referred to as "tristimulus values" hereinafter by omitting "XYZ" from the "XYZ tristimulus values".

First Embodiment

Arrangement of Apparatus

Figure 1:
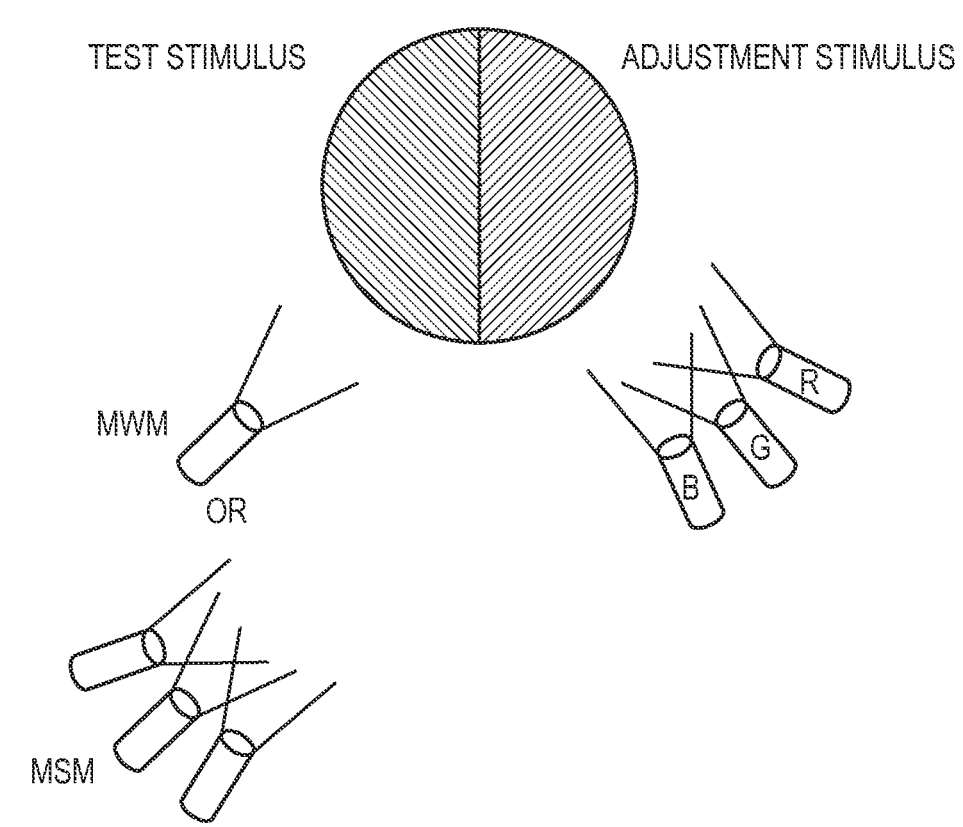
FIG. 1 is a view showing the schematic arrangement of a color matching experiment for obtaining color matching functions.
Figure 2:
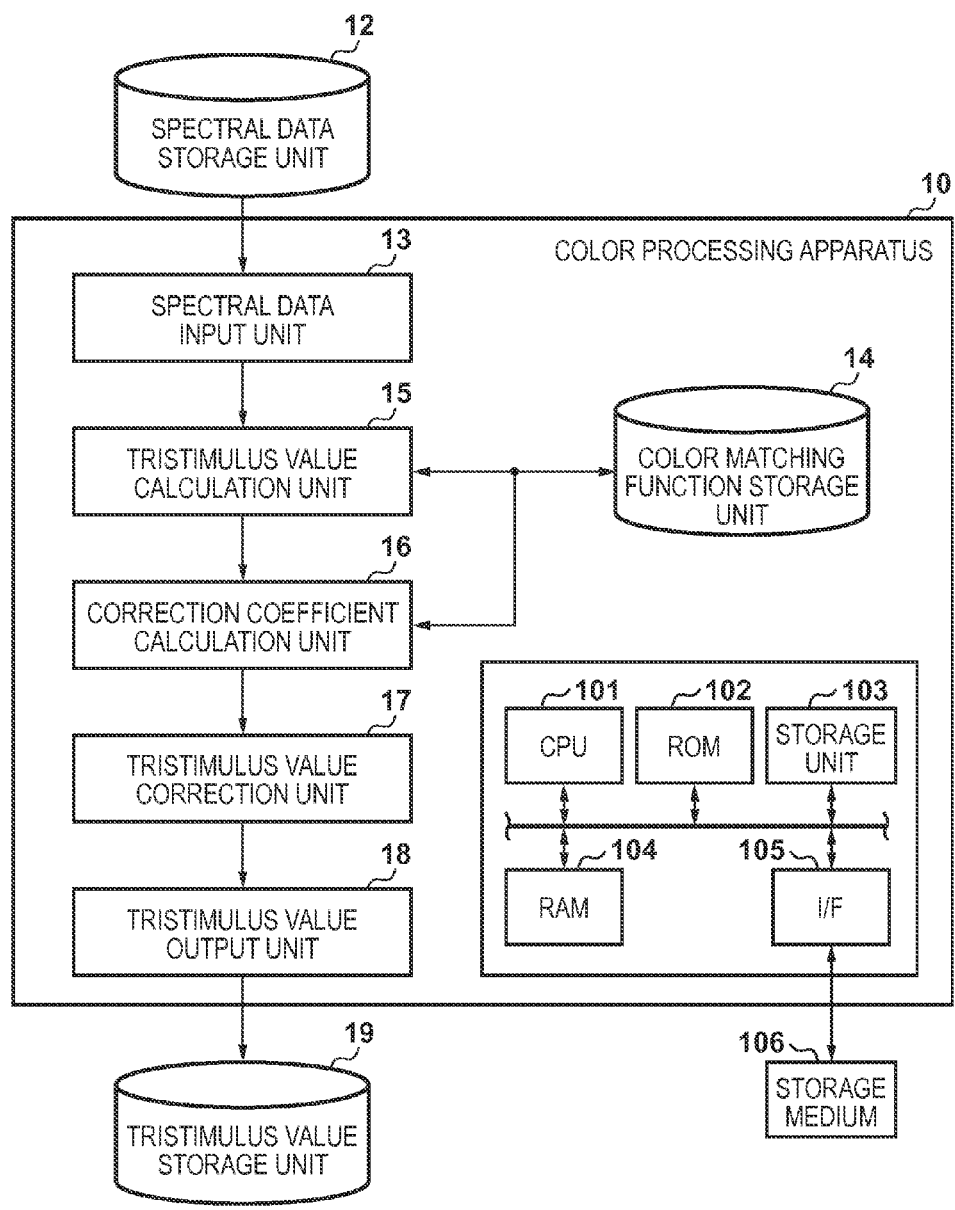
FIG. 2 is a block diagram for explaining the arrangement of a color processing apparatus according to the first embodiment.

The arrangement of a color processing apparatus 10 according to the first embodiment will be described with reference to a block diagram shown in FIG. 2.

A spectral data storage unit 12 is a storage medium for storing spectral data measured by a spectral colorimeter such as a spectral radiancemeter. A spectral data input unit 13 loads the spectral data stored in the spectral data storage unit 12. A color matching function storage unit 14 is a storage medium for storing a plurality of sets of color matching functions.

A tristimulus value calculation unit 15 calculates tristimulus values using the spectral data loaded by the spectral data input unit 13 and the color matching functions stored in the color matching function storage unit 14. A correction coefficient calculation unit 16 calculates correction coefficients for correcting the tristimulus values calculated by the tristimulus value calculation unit 15.

A tristimulus value correction unit 17 corrects the tristimulus values calculated by the tristimulus value calculation unit 15 using the correction coefficients calculated by the correction coefficient calculation unit 16. A tristimulus value output unit 18 outputs tristimulus values corrected by the tristimulus value correction unit 17. A tristimulus value storage unit 19 is a storage medium for storing the tristimulus values output from the tristimulus value output unit 18.

The tristimulus values calculated from the spectral data and corrected are stored in the tristimulus value storage unit 19 together with the measurement condition of the spectral data. An image processing apparatus or the like uses the tristimulus values stored in the tristimulus value storage unit 19 for color matching.

As the spectral data storage unit 12, color matching function storage unit 14, and tristimulus value storage unit 19, recording media which may be a hard disk drive (HDD), solid-state drive (SSD), and memory card, a server apparatus connected to the color processing apparatus 10 through a network, and the like are usable.

The spectral data storage unit 12, color matching function storage unit 14, and tristimulus value storage unit 19 may be assigned to different storage devices or one storage device. These storage devices may be incorporated in the color processing apparatus 10 or connected to the color processing apparatus 10 through a network or a serial bus such as USB (Universal Serial Bus). If the spectral data storage unit 12 and tristimulus value storage unit 19 are incorporated in the color processing apparatus 10, the spectral data input unit 13 and tristimulus value output unit 18 function as interfaces connected to a measuring apparatus and an apparatus which uses the tristimulus values.

The spectral data input unit 13, the tristimulus value calculation unit 15, the correction coefficient calculation unit 16, the tristimulus value correction unit 17, the tristimulus value output unit 18 are implemented using a microprocessor (CPU) 101 that executes a program to realize the color processing according to the embodiment. In other words, the CPU 101 executes an operating system (OS) and the program stored in a read only memory (ROM) 102 or a storage unit 103 using a random access memory (RAM) 104 as a work memory, thereby the color processing apparatus 10 is realized.

The storage unit 103 is HDD, SSD, or the like, and the color matching function storage unit 14 can be assigned to the storage unit 103. The CPU 101 can read/write data from/to a storage medium 106 and various devices through a general-purpose interface (I/F) 105 such as USB. The storage medium 106 comprises the spectral data storage unit 12, and the tristimulus value storage unit 19.

[Calculation of Tristimulus Values]

Tristimulus value calculation processing will be described with reference to a flowchart shown in FIG. 3. The tristimulus value calculation processing is processing executed by the color processing apparatus 10.

The spectral data input unit 13 loads spectral data stored in the spectral data storage unit (S201). When the spectral data is loaded, the tristimulus value calculation unit 15 calculates a plurality of sets of tristimulus values using the loaded spectral data and the plurality of sets of color matching functions stored in the color matching function storage unit 14 (S202), which will be described in detail later.

The correction coefficient calculation unit 16 calculates correction coefficients of the tristimulus values (S203), which will be described in detail later. When the correction coefficients are calculated, the tristimulus value correction unit 17 calculates corrected tristimulus values using the calculated correction coefficients and the plurality of sets of tristimulus values calculated in step S202 (S204). The tristimulus value output unit 18 then stores the corrected tristimulus values in the tristimulus value storage unit 19 (S205).

Note that in addition to the corrected tristimulus values, the plurality of sets of tristimulus values before correction, the correction coefficients, and the like may be stored in the tristimulus value storage unit 19.

Tristimulus Value Calculation Unit

The plurality of sets of color matching functions used by the tristimulus value calculation unit 15 to calculate a plurality of sets of tristimulus values (S202) will be described below.

The tristimulus value calculation unit 15 converts the spectral data into tristimulus values (XYZ values) by:

$$X = k\int S(\lambda) \cdot x(\lambda) d\lambda;$$

$$Y = k\int S(\lambda) \cdot y(\lambda) d\lambda;$$

$$Z = k\int S(\lambda) \cdot z(\lambda) d\lambda; \quad (1)$$

where $S(\lambda)$ represents the spectral data,
$x(\lambda)$, $y(\lambda)$, and $z(\lambda)$ respectively represent color matching functions,
k represents a constant, and
the integration range is, for example, from 380 nm to 780 nm.

In equations (1), when a color to be calculated is a light-source color such as an illumination light source or display, $S(\lambda)$ is a spectral radiance $I(\lambda)$ and the constant k is 683 lm/W. Alternatively, if the color to be calculated is an object color such as a printed material, $S(\lambda)$ is a product of the spectral radiance $I(\lambda)$ of a light source and the spectral reflectance $R(\lambda)$ of an object, and the constant k is calculated by:

$$k = 100 / \{\int I(\lambda) \cdot y(\lambda) d\lambda\}; \quad (2)$$

where $I(\lambda)$ represents the spectral radiance of the illumination light source.

The color matching functions used in equations (1) and (2) change depending on the target color, as described above. Two sets of tristimulus values $X_{MSM}$, $Y_{MSM}$, and $Z_{MSM}$, and $X_{MWM}$, $Y_{MWM}$, and $Z_{MWM}$ are calculated using, for example, MSM color matching functions and MWM color matching functions, as given by:

$$X_{MSM}=k\int S(\lambda)\cdot x_{MSM}(\lambda)d\lambda;$$

$$Y_{MSM}=k\int S(\lambda)\cdot y_{MSM}(\lambda)d\lambda;$$

$$Z_{MSM}=k\int S(\lambda)\cdot z_{MSM}(\lambda)d\lambda;$$

$$X_{MWM}=k\int S(\lambda)\cdot x_{MWM}(\lambda)d\lambda;$$

$$Y_{MWM}=k\int S(\lambda)\cdot y_{MWM}(\lambda)d\lambda;$$

$$Z_{MWM}=k\int S(\lambda)\cdot z_{MWM}(\lambda)d\lambda; \quad (3)$$

where $x_{MSM}(\lambda)$, $y_{MSM}(\lambda)$, and $z_{MSM}(\lambda)$ respectively represent the MSM color matching functions, and $x_{MWM}(\lambda)$, $y_{MWM}(\lambda)$, and $z_{MWM}(\lambda)$ respectively represent the MWM color matching functions.

Correction Coefficient Calculation Unit

Figure 9:
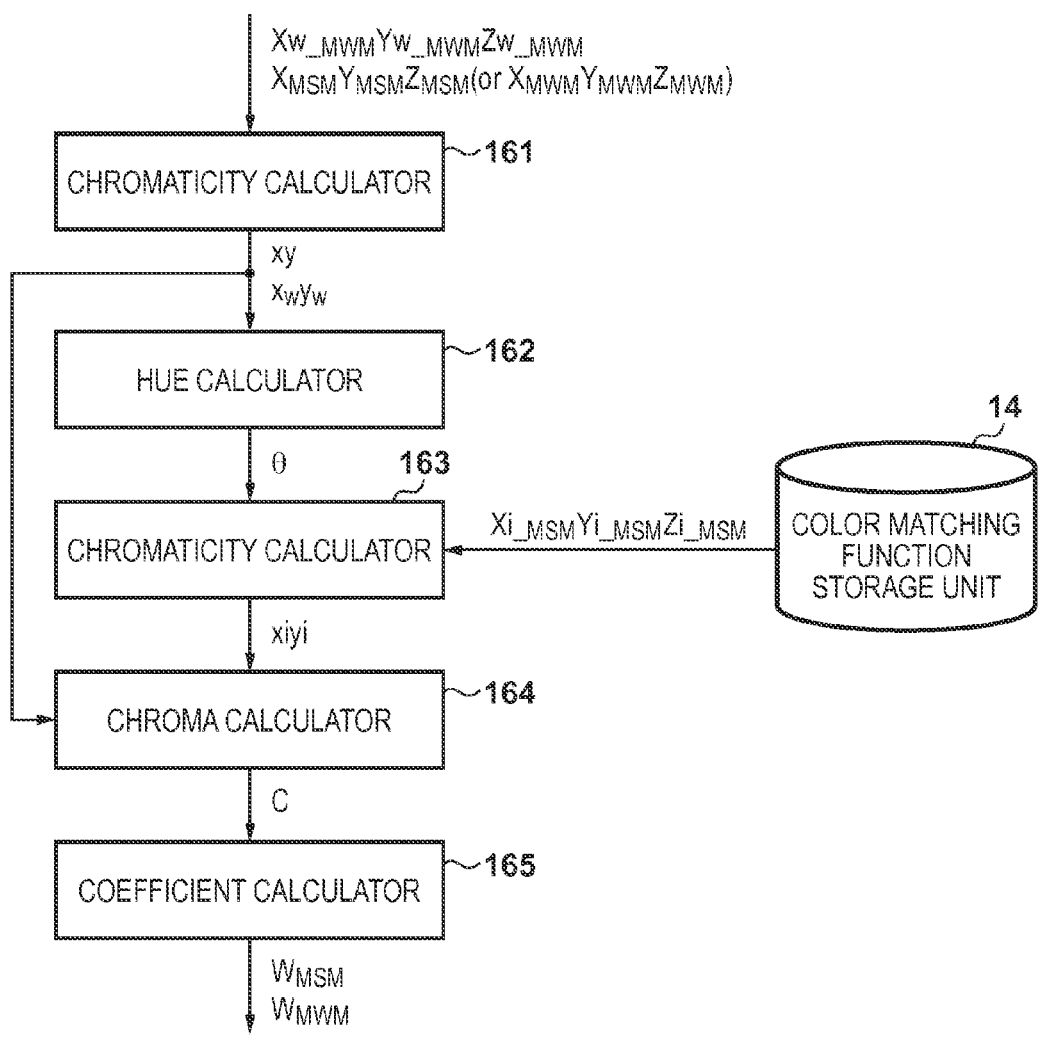
FIG. 9 is a block diagram showing the arrangement of a correction coefficient calculation unit according to the first embodiment.

As described above, the color matching functions change depending on whether the target color is monochromatic light (high saturation) or white light (low saturation). Calculation (S203) of the correction coefficients of the tristimulus values by the correction coefficient calculation unit 16 will be described below. FIG. 9 is a block diagram showing the arrangement of the correction coefficient calculation unit 16.

A chromaticity calculator 161 calculates the xy chromaticity $(x_w, y_w)$ of white light (to be referred to as MWM white hereinafter) as a test stimulus in an MWM color matching experiment, and the xy chromaticity of the MSM tristimulus values, as given by:

$$x_w=X_{w\_MWM}/(X_{w\_MWM}+Y_{w\_MWM}+Z_{w\_MWM});$$

$$y_w=Y_{w\_MWM}/(X_{w\_MWM}+Y_{w\_MWM}+Z_{w\_MWM});$$

$$x=X_{MSM}/(X_{MSM}+Y_{MSM}+Z_{MSM});$$

$$y=Y_{MSM}/(X_{MSM}+Y_{MSM}+Z_{MSM}); \quad (4)$$

where $X_{w\_MWM}$, $Y_{w\_MWM}$, and $Z_{w\_MWM}$ respectively represent the tristimulus values of MWM white, and $X_{MSM}$, $Y_{MSM}$, and $Z_{MSM}$ respectively represent the MSM tristimulus values.

Note that equations (4) indicate an example in which the MSM tristimulus values are used for calculation of the xy chromaticity of the color to be converted. However, other tristimulus values may be used. For example, the MWM tristimulus values may be used, or the average values of the MSM tristimulus values and MWM tristimulus values may be set as xy chromaticity of the color to be converted.

A hue calculator 162 calculates an angle θ associated with the hue of the MSM tristimulus values based on the xy chromaticity $(x_w, y_w)$ of MWM white and the xy chromaticity of the MSM tristimulus values by:

$$\theta=\tan^{-1}\{(y-y_w)/(x-x_w)\}; \quad (5)$$

A chromaticity calculator 163 calculates an intersecting point $(x_i, y_i)$ of a straight line extended from a white chromaticity point $(x_w, y_w)$ at the angle θ and an optimal color line represented by a horseshoe-shaped curve in an xy chromaticity diagram. Monochromatic light with a hue closest to that corresponding to the angle θ will be referred to as "corresponding monochromatic light" hereinafter.

A chroma calculator 164 calculates a chroma C of the color to be converted, as given by:

$$C=\sqrt{\{(x_w-x)^2+(y_w-y)^2\}}/\sqrt{\{(x_w-x_i)^2+(y_w-y_i)^2\}}; \quad (6)$$

Note that the chroma C calculated by equation (6) represents the color purity at the xy chromaticity.

FIG. 4 is an xy chromaticity diagram showing the relationship between the chromaticity point of the color to be converted, the chromaticity point of MWM white, and the chromaticity point of the corresponding monochromatic light.

Referring to FIG. 4, a point 302 (to be referred to as a "white point 302" hereinafter) corresponds to the chromaticity point of MWM white, and a point 301 corresponds to the chromaticity point of the color to be converted. A point 303 at which a line segment extended from the white point 302 to the point 301 intersects a horseshoe-shaped optimal color line 304 corresponds to an optimal color in the hue of the color to be converted. The chromaticity point of the corresponding monochromatic light is considered to be near the optimal color 303. In other words, the line segment connecting the white point 302 and the chromaticity point 301 of the color to be converted is considered to pass through the optimal color point 303 near the chromaticity point of the corresponding monochromatic light.

The chroma C calculated by equation (6) corresponds to the distance between the chromaticity point 301 of the color to be converted and the white point 302 when the distance between the white point 302 and the chromaticity point (almost the optimal color point 303) of the corresponding monochromatic light is normalized to 1. That is, if the color to be converted is equal to MWM white, C=0. If the color to be converted is equal to the chromaticity point of the corresponding monochromatic light, C=1.

A coefficient calculator 165 calculates a correction coefficient W for each set of the tristimulus values based on the chroma C calculated by equation (6), as given by:

$$W_{MSM}(C)=C;$$

$$W_{MWM}(C)=1-C; \quad (7)$$

FIGS. 5A to 5C each show the relationship between the chroma C and the correction coefficients W. FIG. 5A shows the correction coefficients W calculated by equations (7). When C=0, the correction coefficient $W_{MWM}$ of the MWM tristimulus values is 1 and the correction coefficient $W_{MSM}$ of the MSM tristimulus values is 0. Consequently, the corrected tristimulus values are equal to the MWM tristimulus values. When C=1, the correction coefficient $W_{MWM}$ of the MWM tristimulus values is 0 and the correction coefficient $W_{MSM}$ of the MSM tristimulus values is 1. Consequently, the corrected tristimulus values are equal to the MSM tristimulus values. Furthermore, when 0<C<1, the corrected tristimulus values are equal to the linear sums of the MWM tristimulus values and MSM tristimulus values.

The equations for calculating the correction coefficients W are not limited to equations (7). For example, equations (8) can be used. FIGS. 5B and 5C show nonlinear correction coefficients W calculated by:

$$W_{MSM}(C)=C^\gamma;$$

$$W_{MWM}(C)=1-W_{MSM}; \quad (8)$$

where $0<\gamma$.

That is, details of equations for calculating the correction coefficients W are not limited as long as the equations satisfy:

$W_{MSM}(0)=0;$
$W_{MSM}(1)=1;$
$W_{MWM}(0)=1;$
$W_{MWM}(1)=0;$ $$W_{MSM}(C)+W_{MWM}(C)=1; \quad (9)$$

the function $W_{MSM}(C)$ represents a monotone increasing function with respect to the increasing chroma C;

the function $W_{MWM}(C)$ represents a monotone decreasing function with respect to the increasing chroma C;

Tristimulus Value Correction Unit

The tristimulus value correction unit 17 calculates the corrected tristimulus values (S204) by:

$$X_C = W_{MWM} \cdot X_{MWM} + W_{MSM} \cdot X_{MSM};$$

$$Y_C = W_{MWM} \cdot Y_{MWM} + W_{MSM} \cdot Y_{MSM};$$

$$Z_C = W_{MWM} \cdot Z_{MWM} + W_{MSM} \cdot Z_{MSM}; \qquad (10)$$

As described above, it is possible to prevent the conversion accuracy from decreasing due to a method of deriving color matching functions by converting spectral data into tristimulus values using a plurality of sets of color matching functions, thereby obtaining tristimulus values having high correlation to the color perceived by an observer. In other words, it is possible to perform color system conversion having high correlation to the color perceived by the observer.

Second Embodiment

Color Processing according to the second embodiment of the present invention will be described below. Note that the same reference numerals as in the first embodiment denote the same components in the second embodiment and a detailed description thereof will be omitted.

In the first embodiment, the color processing of calculating, from spectral data, tristimulus values having high correlation to the color perceived by an observer has been explained. In the second embodiment, color processing of generating a color matching lookup table (LUT) for matching the colors of a plurality of imaging equipments will be described.

[Arrangement of Apparatus]

Figure 6:
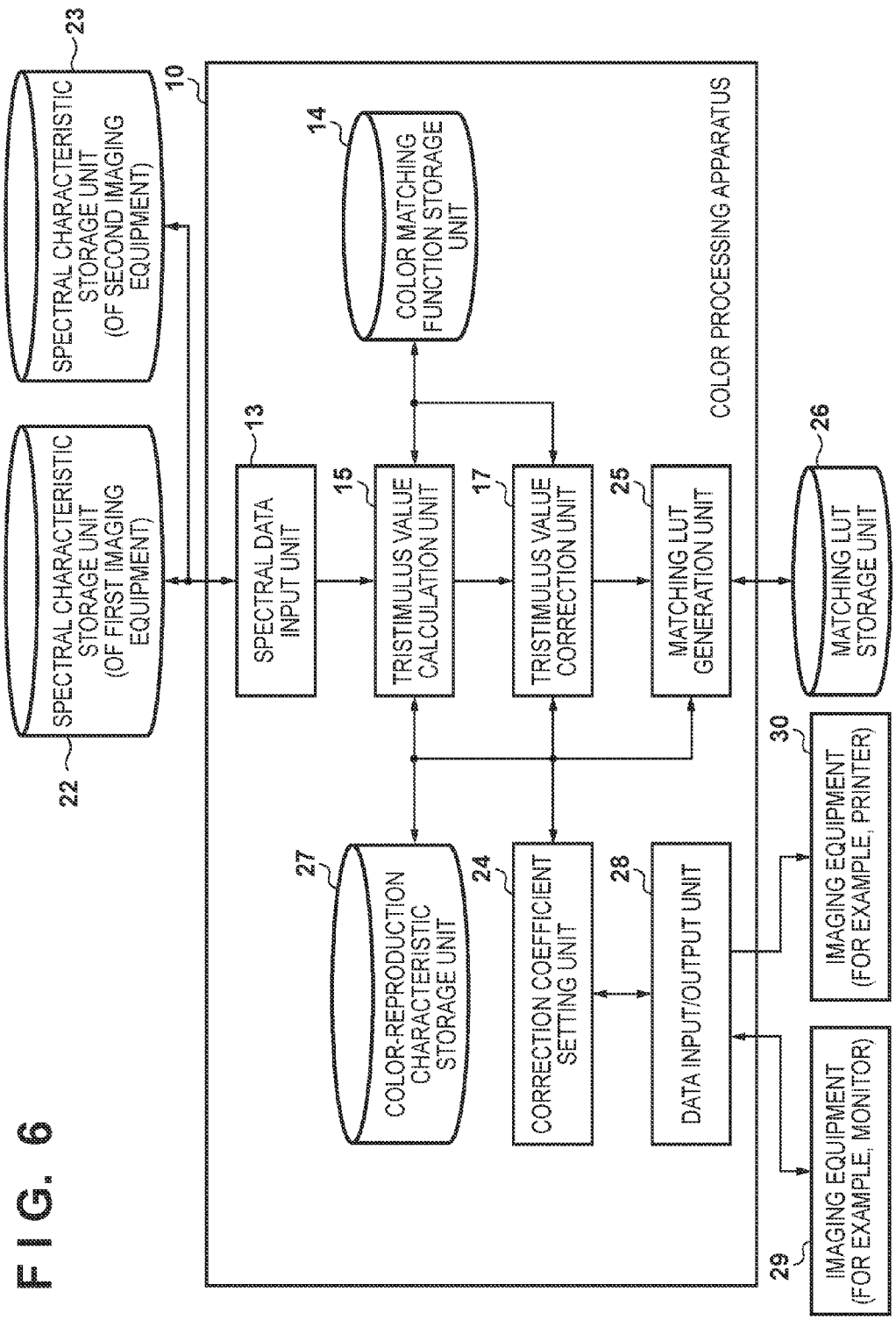
FIG. 6 is a block diagram for explaining the arrangement of a color processing apparatus according to the second embodiment.

A color processing apparatus 10 according to the second embodiment will be described with reference to a block diagram shown in FIG. 6.

A spectral characteristic storage unit 22 stores the spectral characteristic data of one imaging equipment (first imaging equipment) 29. A spectral characteristic storage unit 23 stores the spectral characteristic data of another imaging equipment (second imaging equipment) 30. Note that the first imaging equipment 29 is a color matching reference equipment, for example, a monitor. The second imaging equipment 30 is an imaging equipment to undergo color matching to the first imaging equipment by applying a color matching LUT, for example, a printer.

In the second embodiment, a spectral data input unit 13 loads the spectral characteristic data from the spectral characteristic storage units 22 and 23. A color matching function storage unit 14, tristimulus value calculation unit 15, and tristimulus value correction unit 17 are the same as those in the first embodiment.

A color-reproduction characteristic storage unit 27 stores color-reproduction characteristic tables calculated by the tristimulus value calculation unit 15 from the spectral characteristic data.

A correction coefficient setting unit 24 sets correction coefficients for correcting tristimulus values calculated by the tristimulus value calculation unit 15, which will be described in detail later. A data input/output unit 28 outputs image data for correction coefficient adjustment to the first imaging equipment 29 and the second imaging equipment 30 through a network or serial bus such as USB, and also receives correction coefficient adjustment data from the first imaging equipment 29.

A matching LUT generation unit 25 generates a color matching LUT between the first imaging equipment 29 and the second imaging equipment 30 using the corrected tristimulus values in the color-reproduction characteristic tables, and stores the generated LUT in a matching LUT storage unit 26.

As the spectral characteristic storage units 22 and 23 and the matching LUT storage unit 26, recording media which may be an HDD, SSD, and memory card, a server apparatus connected to the color processing apparatus 10 through a network, and the like are usable.

The spectral characteristic storage units 22 and 23, color matching function storage unit 14, matching LUT storage unit 26, and color-reproduction characteristic storage unit 27 may be assigned to different storage devices or one storage device. These storage devices may be incorporated in the color processing apparatus 10 or connected to the color processing apparatus 10 through the network or the serial bus which may be USB. If the spectral characteristic storage units 22 and 23 and the matching LUT storage unit 26 are incorporated in the color processing apparatus 10, the spectral data input unit 13 functions as an interface connected to a measuring apparatus or an apparatus which uses the color matching LUT.

The spectral characteristic storage unit 22 may exist in the first imaging equipment 29, and the spectral characteristic storage unit 23 and matching LUT storage unit 26 may exist in the second imaging equipment 30. Alternatively, the spectral characteristic storage units 22 and 23 and the matching LUT storage unit 26 may exist in a computer equipment connected to the first imaging equipment 29 and second imaging equipment 30.

The correction coefficient setting unit 24, the matching LUT generation unit 25, and the data input/output unit 28 are implemented using the CPU 101 that executes the program to realize the color processing according to the embodiment. the color-reproduction characteristic storage unit 27 can be assigned to the storage unit 103. The storage medium 106 comprises the spectral characteristic storage units 22 and 23, and the matching LUT storage unit 26.

[Generation of Color Matching LUT]

Figure 7B:
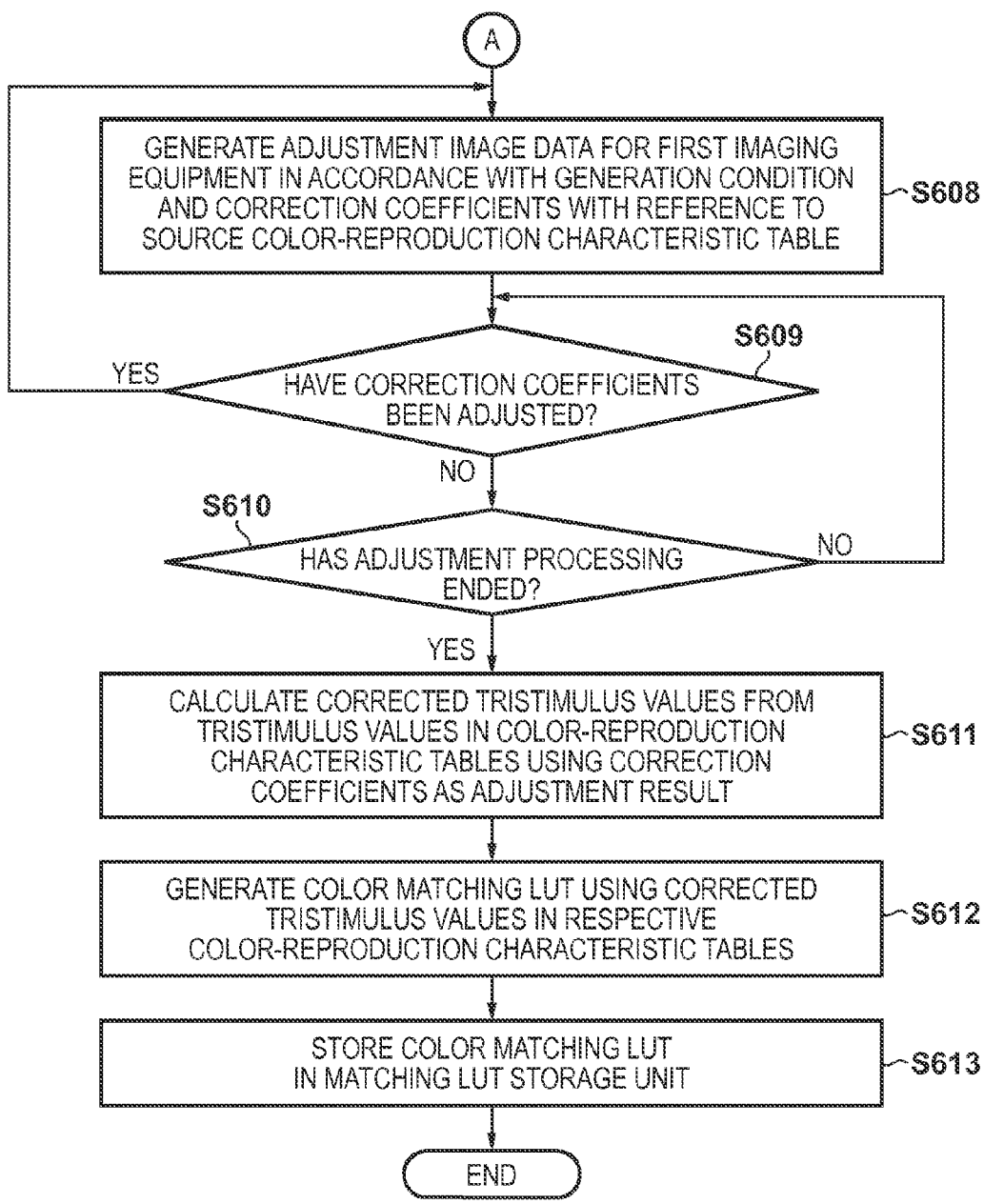

Processing of generating a color matching LUT will be described with reference to flowcharts shown in FIGS. 7A and 7B. The processing of generating a color matching LUT is processing which is executed by the color processing apparatus 10 when the user issues a generation start instruction.

When the first imaging equipment 29 starts to adjust the correction coefficients, the spectral data input unit 13 loads the spectral characteristic data from the spectral characteristic storage unit 22 (S601). The tristimulus value calculation unit 15 generates a source color-reproduction characteristic table using the spectral characteristic data of the first imaging equipment 29 and a plurality of sets of color matching functions stored in the color matching function storage unit 14 (S602). The spectral characteristic data of the first imaging equipment 29 are spectral data for respective signal values (for example, sRGB values) corresponding to the grid points of the LUT. The tristimulus value calculation unit 15 calculates two sets of tristimulus values corresponding to each grid point, and generates a source color-reproduction characteristic table including the two sets of tristimulus values for each grid point.

The spectral data input unit 13 loads the spectral characteristic data from the spectral characteristic storage unit 23 (S603). The tristimulus value calculation unit 15 generates a destination color-reproduction characteristic table using the spectral characteristic data of the second imaging equipment 30 and the plurality of sets of color matching functions stored in the color matching function storage unit 14 (S604). The spectral characteristic data of the second imaging equipment 30 are spectral data for respective signal values (for example, CMYK values) corresponding to the grid points of the LUT. The tristimulus value calculation unit 15 calculates two sets of tristimulus values corresponding to each grid point, and generates a destination color-reproduction characteristic table including the two sets of tristimulus values for each grid point.

The source and destination color-reproduction characteristic tables are stored in the color-reproduction characteristic storage unit 27. The correction coefficient setting unit 24 calculates an xy chromaticity corresponding to each grid point from the tristimulus values of the grid point in the source and destination color-reproduction characteristic tables, and adds the xy chromaticity to the source and destination color-reproduction characteristic tables (S605).

The correction coefficient setting unit 24 inputs the generation condition of an image (to be referred to as an "adjustment image" hereinafter) for correction coefficient adjustment (S606). The correction coefficient setting unit 24 then generates adjustment image data for the second imaging equipment in accordance with the generation condition and the initial correction coefficients with reference to the destination color-reproduction characteristic table, and outputs the adjustment image data to the second imaging equipment 30 through the data input/output unit 28 (S607). Furthermore, the correction coefficient setting unit 24 generates adjustment image data for the first imaging equipment in accordance with the generation condition and the correction coefficients with reference to the source color-reproduction characteristic table, and outputs the adjustment image data to the first imaging equipment 29 through the data input/output unit 28 (S608).

Although described in detail later, the user compares the color of an image output from the first imaging equipment 29 with that of an image output from the second imaging equipment 30, and adjusts the correction coefficients so as to obtain color matching between the equipments.

The correction coefficient setting unit 24 determines whether the correction coefficients have been adjusted (S609), and also determines whether the adjustment processing has ended (S610). If the correction coefficients have been adjusted, the process returns to step S608 to regenerate adjustment image data for the first imaging equipment in accordance with the generation condition and the adjusted correction coefficients.

Upon the end of the adjustment processing, the tristimulus value correction unit 17 calculates corrected tristimulus values from the tristimulus values in the source and destination color-reproduction characteristic tables using the correction coefficients as an adjustment result (S611). The method of calculating corrected tristimulus values is the same as in the first embodiment. The corrected tristimulus values are added to the source and destination color-reproduction characteristic tables.

The matching LUT generation unit 25 generates a color matching LUT using the corrected tristimulus values in the source and destination color-reproduction characteristic tables (S612). Note that a general method can be used as a profile generation method. The generated color matching LUT is stored in the matching LUT storage unit 26 (S613).

Adjustment of Correction Coefficients

Figure 8:
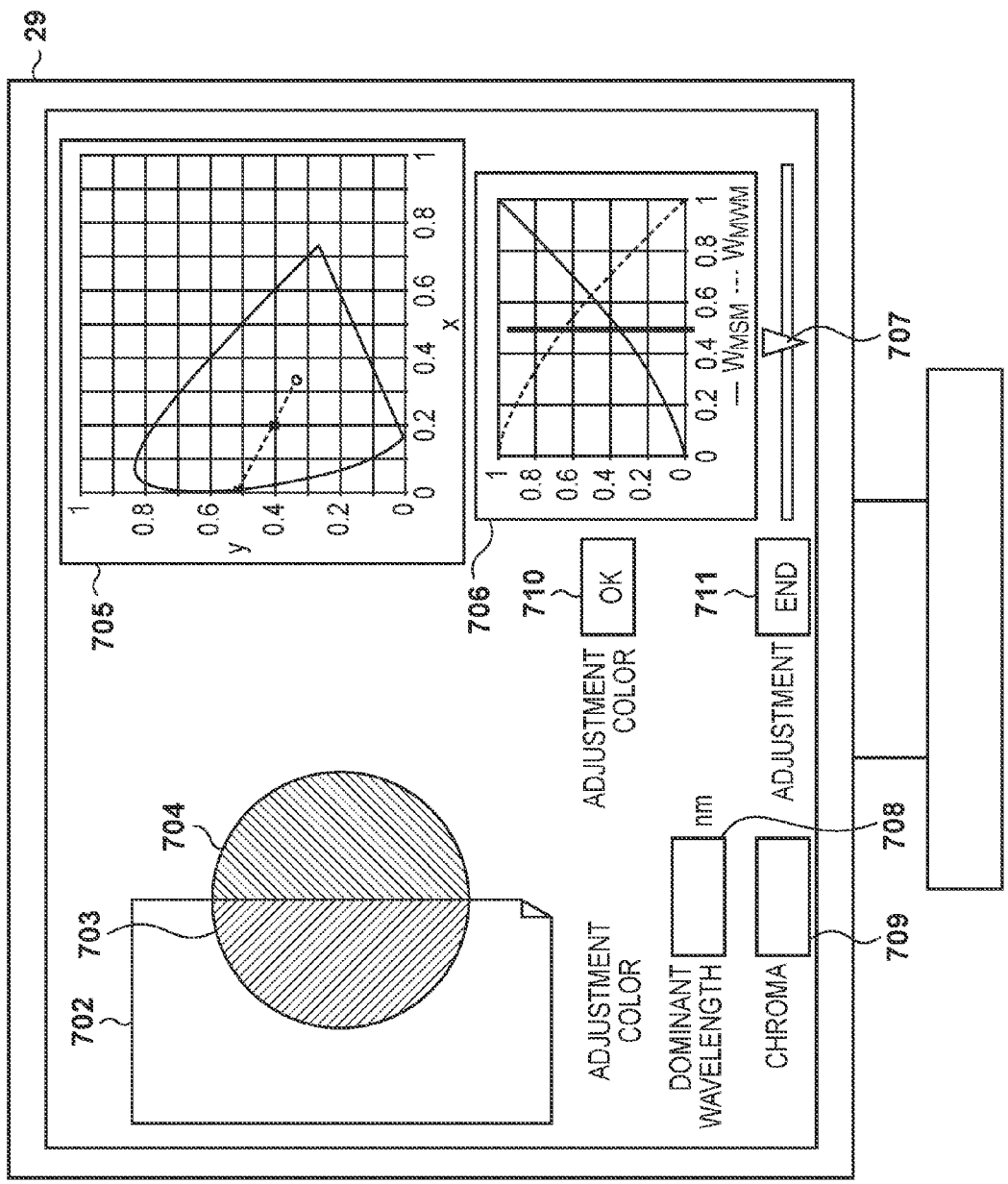
FIG. 8 is a view showing an example of a user interface for adjusting correction coefficients.

FIG. 8 shows an example of a user interface (UI) for adjusting the correction coefficients. Note that the UI shown in FIG. 8 is displayed on the first imaging equipment 29 in the second embodiment.

The user designates a color (to be referred to as an "adjustment color" hereinafter) to adjust the correction coefficients by operating a dominant wavelength setting unit 708 and chroma setting unit 709 of the UI. Note that the adjustment color is desirably a middle-saturation color. The dominant wavelength and chroma value of the adjustment color are input to the correction coefficient setting unit 24 through the data input/output unit 28.

The correction coefficient setting unit 24 calculates an xy chromaticity corresponding to the dominant wavelength and chroma value, and displays the chromaticity point of the adjustment color on an xy chromaticity diagram in a window 705. Note that a white point on the xy chromaticity diagram in the window 705 corresponds to the chromaticity point of MWM white. The user can designate an adjustment color by pointing on the xy chromaticity diagram or moving the chromaticity point using a pointing device. Upon the end of designation of the adjustment color, the user presses an "OK" button 710 of the adjustment color of the UI.

The correction coefficient setting unit 24 uses the xy chromaticity of the adjustment color as a generation condition to acquire signal values corresponding to the generation condition from the source and destination color-reproduction characteristic tables. The signal values acquired from the source color-reproduction characteristic table indicate the initial adjustment image data for the first imaging equipment, and the signal values acquired from the destination color-reproduction characteristic table indicate the adjustment image data for the second imaging equipment.

The correction coefficient setting unit 24 performs the interpolation operation of the adjustment image data using signal values corresponding to a plurality of xy chromaticities surrounding the xy chromaticity of the adjustment color. At this time, the correction coefficient $W_{MWM}$ is used as a weight of the signal value corresponding to the xy chromaticity of the MWM tristimulus values and the correction coefficient $W_{MSM}$ is used as a weight of the signal value corresponding to the xy chromaticity of the MSM tristimulus values, thereby performing the interpolation operation of the adjustment image data. The initial correction coefficients satisfy, for example, $W_{MWM}=W_{MSM}=0.5$. The correction coefficient setting unit 24 displays an image representing the current correction coefficients in the window 706 of the UI.

The color based on the initial adjustment image data for the first imaging equipment is displayed on a display unit 704 of the UI. The second imaging equipment 30 outputs a print 702 obtained by printing a semicircular image 703 based on the adjustment image data for the second imaging equipment. As shown in FIG. 8, the user arranges the print 702 so that the image 703 of the print 702 is adjacent to the display unit 704. The user then operates a slider 707 of the UI so as to match the color of the display unit 704 to the color of the image 703.

The position information of the slider 707 is input, as adjustment information, to the correction coefficient setting unit 24 through the data input/output unit 28. The correction coefficient setting unit 24 changes the correction coefficients $W_{MWM}$ and $W_{MSM}$ according to the adjustment information, and performs the interpolation operation of the adjustment image data for the first imaging equipment using the changed correction coefficients as weights. This changes the color of the display unit 704 of the UI and display of a window 706 according to the user operation of the slider 707.

In the initial state, adjustment is performed to linearly change the correction coefficients, as shown in FIG. 5A. Adjustment to nonlinearly change the correction coefficients may be performed, as shown in FIGS. 5B and 5C. When the user determines that color matching has been obtained by operating the slider 707, he/she presses an "end" button 711 of adjustment of the UI.

As described above, it is possible to prevent the conversion accuracy from decreasing due to a method of deriving color matching functions by converting spectral data into tristimulus values using a plurality of sets of color matching functions, thereby generating a color matching table. Furthermore, correction coefficients obtained as a result of performing adjustment by visual observation by the user so as to obtain color matching are set, thereby obtaining optimum correction coefficients of the tristimulus values for an actual imaging equipment. It is, therefore, possible to generate a color matching LUT having high correlation to the color perceived by an observer by calculating corrected tristimulus values using the correction coefficients.

Modification of Embodiments

The color processing apparatus 10 according to each of the first and second embodiments can be formed by hardware. The color processing apparatus 10 can also be formed by supplying software which implements the functions of the respective components and the color processing of each embodiment to a general-purpose computer equipment, and causing the computer equipment to execute the software.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-064346 filed Mar. 26, 2014 which is hereby incorporated by reference herein in its entirety.

What is claimed is:

1. A color processing apparatus comprising:
an obtaining unit configured to obtain spectral characteristic data of plural different imaging equipments on which color matching is to be performed;
a first generation unit configured to generate plural color-reproduction characteristic tables, each color-reproduction characteristic table corresponding to a respective one of the plural different imaging equipments, wherein each color-reproduction characteristic table contains a plurality of sets of tristimulus values calculated from the spectral characteristic data using a plurality of sets of color matching functions;
a setting unit configured to set correction coefficients for tristimulus values using the plural different imaging equipments;
a calculation unit configured to calculate, for each color-reproduction characteristic table, corrected tristimulus values from the plurality of sets of tristimulus values contained in the color-reproduction characteristic table using the correction coefficients; and
a second generation unit configured to generate a table for color matching between the plural different imaging equipments, the table being generated using the corrected tristimulus values contained in the color-reproduction characteristic tables for the plural different imaging equipments,
wherein at least one of the obtaining unit, the first generation unit, the second generation unit, the setting unit, and the calculation unit is implemented using a processor and a memory which stores a program for execution by the processor.

2. The apparatus according to claim 1, wherein the setting unit performs steps of:
calculating chromaticities of the plurality of sets of tristimulus values contained in each of the color-reproduction characteristic tables;
inputting, from one of the plural different imaging equipments, a generation condition for an adjustment image to adjust the correction coefficients; and
generating data for the adjustment image, which corresponds to the correction coefficients and is to be output to said one of the plural different imaging equipments, by reference to the color-reproduction characteristic table based on the calculated chromaticities and the generation condition.

3. The apparatus according to claim 2, wherein the setting unit generates the data for the adjustment image to be output to said one of the plural different imaging equipments by reference to the color-reproduction characteristic table generated from the spectral characteristic data of said one of the plural different imaging equipments, and generates the data for the adjustment image to be output to another of the plural different imaging equipments by reference to the color-reproduction characteristic table generated from the spectral characteristic data of said other of the plural different imaging equipments.

4. The apparatus according to claim 3, wherein the setting unit changes the correction coefficients in accordance with adjustment information input from said one of the plural different imaging equipments, and regenerates the data of the adjustment image to be output to said other of the plural different imaging equipments in accordance with the changed correction coefficients.

5. The apparatus according to claim 4, wherein the setting unit supplies a user interface to input the generation condition and the adjustment information to the imaging equipment.

6. The apparatus according to claim 2, wherein the generation condition comprises chromaticities of the adjustment image.

7. The apparatus according to claim 1, wherein the plurality sets of color matching functions includes a first set of color matching functions derived from a first color matching experiment using synthesis of a plurality of monochromatic light with high saturation as a test stimulus, and a second set of color matching functions a derived from a second color matching experiment using single white light as a test stimulus.

8. A color processing method performed by a processor which executes a program stored in a memory, comprising:
obtaining spectral characteristic data of plural different imaging equipments on which color matching is to be performed;
generating plural color-reproduction characteristic tables, each color-reproduction characteristic table corresponding to a respective one of the plural different imaging equipments, wherein each color-reproduction characteristic table contains a plurality of sets of tristimulus values calculated from the spectral characteristic data using a plurality of sets of color matching functions;
setting correction coefficients for tristimulus values using the plural different imaging equipments;
calculating, for each color-reproduction characteristic table, corrected tristimulus values from the plurality of sets of tristimulus values contained in the color-reproduction characteristic table using the correction coefficients; and
generating a table for color matching between the plural different imaging equipments, the table being generated using the corrected tristimulus values contained in the color-reproduction characteristic tables for the plural different imaging equipments.

9. A non-transitory computer readable memory medium storing a computer-executed program for causing a processor to perform a color processing method, the method comprising:
obtaining spectral characteristic data of plural different imaging equipments on which color matching is to be performed;
generating plural color-reproduction characteristic tables, each color-reproduction characteristic table corresponding to a respective one of the plural different imaging equipments, wherein each color-reproduction characteristic table contains a plurality of sets of tristimulus values calculated from the spectral characteristic data using a plurality of sets of color matching functions;
setting correction coefficients for tristimulus values using the plural different imaging equipments;
calculating, for each color-reproduction characteristic table, corrected tristimulus values from the plurality of sets of tristimulus values contained in the color-reproduction characteristic table using the correction coefficients; and
generating a table for color matching between the plural different imaging equipments, the table being generated using the corrected tristimulus values contained in the color-reproduction characteristic tables for the plural different imaging equipments.

10. A color processing apparatus comprising:
a first calculation unit configured to calculate a plurality of sets of tristimulus values from input spectral data using a plurality of sets of color matching functions, wherein the plurality of sets of color matching functions includes at least first and second sets of color matching functions;
a second calculation unit configured to calculate correction coefficients for tristimulus values based on derivation methods of the plurality of sets of color matching functions; and
a third calculation unit configured to calculate corrected tristimulus values from the plurality of sets of tristimulus values using the correction coefficients,
wherein the first set of color matching functions is derived from a first color matching experiment using synthesis of a plurality of monochromatic light with high saturation as a test stimulus, and the second set of color matching functions is derived from a second color matching experiment using single white light as a test stimulus,
wherein the first to third calculation units are implemented using a processor and a memory which stores a program for execution by the processor, and
wherein the second calculation unit is configured to:
calculate chromaticities of the white light, and calculate chromaticities of a color to be converted using the tristimulus value calculated using the first set of color matching functions or the second set of color matching functions;
calculate an angle related to hue from the chromaticities of the white light and the chromaticities of the color to be converted;
calculate chromaticities of monochromatic light in the first color matching experiment using the monochromatic light having a hue closest to a hue corresponding to the angle as the test stimulus;
calculate chroma of the color to be converted, by using the chromaticities of the white light, the chromaticities of the color to be converted, and the chromaticities of the monochromatic light; and
calculate the correction coefficients based on the chroma.

11. The apparatus according to claim 10, wherein the third calculation unit calculates a linear sum of the plurality sets of tristimulus values, as the corrected tristimulus values, using the correction coefficients.

12. A color processing method performed by a processor which executes a program stored in a memory, comprising:
calculating a plurality of sets of tristimulus values from input spectral data using a plurality of sets of color matching functions, wherein the plurality of sets of color matching functions includes at least first and second sets of color matching functions;
calculating correction coefficients for tristimulus values based on derivation methods of the plurality of sets of color matching functions; and
calculating corrected tristimulus values from the plurality of sets of tristimulus values using the correction coefficients,
wherein the first set of color matching functions is derived from a first color matching experiment using synthesis of a plurality of monochromatic light with high saturation as a test stimulus, and the second set of color matching functions is derived from a second color matching experiment using single white light as a test stimulus, and
wherein the calculation of correction coefficients for tristimulus values comprises:
calculating chromaticities of the white light, and calculating chromaticities of a color to be converted using the tristimulus value calculated using the first set of color matching functions or the second set of color matching functions;

calculating an angle related to hue from the chromaticities of the white light and the chromaticities of the color to be converted;

calculating chromaticities of monochromatic light in the first color matching experiment using the monochromatic light having a hue closest to a hue corresponding to the angle as the test stimulus;

calculating chroma of the color to be converted, by using the chromaticities of the white light, the chromaticities of the color to be converted, and the chromaticities of the monochromatic light; and calculating the correction coefficients based on the chroma.

13. A non-transitory computer readable memory medium storing a computer-executed program for causing a processor to perform a color processing method, the method comprising:

calculating a plurality of sets of tristimulus values from input spectral data using a plurality of sets of color matching functions, wherein the plurality of sets of color matching functions includes at least first and second sets of color matching functions;

calculating correction coefficients for tristimulus values based on derivation methods of the plurality of sets of color matching functions; and calculating corrected tristimulus values from the plurality of sets of tristimulus values using the correction coefficients, wherein the first set of color matching functions is derived from a first color matching experiment using synthesis of a plurality of monochromatic light with high saturation as a test stimulus, and the second set of color matching functions is derived from a second color matching experiment using single white light as a test stimulus, and wherein the calculation of correction coefficients for tristimulus values comprises:

calculating chromaticities of the white light, and calculating chromaticities of a color to be converted using the tristimulus value calculated using the first set of color matching functions or the second set of color matching functions;

calculating an angle related to hue from the chromaticities of the white light and the chromaticities of the color to be converted;

calculating chromaticities of monochromatic light in the first color matching experiment using the monochromatic light having a hue closest to a hue corresponding to the angle as the test stimulus;

calculating chroma of the color to be converted, by using the chromaticities of the white light, the chromaticities of the color to be converted, and the chromaticities of the monochromatic light; and calculating the correction coefficients based on the chroma.

* * * * *